United States Patent [19]
Mellul et al.

[11] Patent Number: 5,433,372
[45] Date of Patent: Jul. 18, 1995

[54] PROCESS FOR THE APPLICATION OF SOLDER COMPOSITION ON THE PINS OF ELECTRONIC COMPONENTS

[75] Inventors: Sylvie Mellul, Vitry Sur Seine; Pierre Claverie, Boulogne Billancourt, both of France

[73] Assignee: L'Air Liquide, Societe Anonyme Pour L'Etude et L'Exploitation des Procedes Georges Claude, Paris, France

[21] Appl. No.: 995,537

[22] Filed: Dec. 22, 1992

[30] Foreign Application Priority Data

Jan. 13, 1992 [FR] France ................ 92 00239

[51] Int. Cl.⁶ .............. B23K 35/38; B23K 31/02
[52] U.S. Cl. ............................. 228/220; 228/219
[58] Field of Search ........................ 228/220, 219

[56] References Cited

U.S. PATENT DOCUMENTS

| | | | |
|---|---|---|---|
| 4,576,659 | 3/1986 | Lewis et al. | 228/220 |
| 4,646,958 | 3/1987 | Howard, Jr. | 228/123 |
| 5,048,746 | 9/1991 | Elliott et al. | 228/220 |
| 5,071,058 | 12/1991 | Nowotarski | 229/219 |

FOREIGN PATENT DOCUMENTS 2653448 4/1991 France .
3813931 11/1989 Germany .

*Primary Examiner*—Mark Rosenbaum
*Assistant Examiner*—Jeffrey T. Knapp
*Attorney, Agent, or Firm*—Young & Thompson

[57] ABSTRACT

A solder composition is applied to the pins of an electronic component. The pins of the component are brought into contact with solder at a soldering station having a bath exposed to a controlled atmosphere of low oxygen content maintained in a hood enclosing at least the surface of the bath. The controlled atmosphere is comprised of at least one neutral gas and a gaseous silicon hydride whose content is between $50 \times 10^{-6}$ and $2 \times 10^{-3}$ of the volume of the controlled atmosphere. The controlled atmosphere is produced:

a) by introducing into the hood the neutral gas to bring the residual oxygen content to less than 200 ppm, then b) by introducing into the hood the neutral gas and the silicon hydride with a content greater than four times the residual oxygen content in the controlled atmosphere, at the end of step a).

6 Claims, No Drawings

PROCESS FOR THE APPLICATION OF SOLDER COMPOSITION ON THE PINS OF ELECTRONIC COMPONENTS

FIELD OF THE INVENTION

The present invention relates to a process for the application of a solder composition on the pins or contact terminals of electronic components, typically for the pretinning of these latter or for brazing of the component on a circuit card, comprising the step of bringing the pins into contact with at least one wave of solder composition in a wave soldering station whose bath is exposed to a controlled atmosphere with low oxygen content, maintained in a hood enclosing at least the surface of the bath.

BACKGROUND OF THE INVENTION

One of the principal problems encountered during use of wave soldering machines is the oxidation of the liquid solder bath, this oxidation creating on the surface of the bath a film or oxide slag which can substantially alter the brazing or tinning of the components and which increases the cost of production. The first solution to reduce the formation of slag on the surface of the solder bath consists in associating with the soldering tank a hood enclosing at least the bath and containing an inert gas, typically nitrogen, constituting the gaseous overhead with the bath. Such a technique is described for example in French application No. 90.15994 in the name of the applicant, whose content is incorporated herein by reference. Although such techniques permit substantially reducing the oxidation of the solder bath, the oxygen content cannot as a practical matter, because of leakage and entry of air on the pass of the component, be reduced to extremely low values, of the order of ppm.

SUMMARY OF THE INVENTION

The present invention has for its object to provide a process of the type mentioned above permitting in a simple, efficacious and easy manner reducing very greatly the contents of residual oxidizing agents, particularly oxygen, above the solder bath.

To do this, according to a characteristic of the invention, the controlled atmosphere is comprised by at least one neutral gas and a gaseous silicon hydride whose content is between $50 \times 10^{-6}$ and $2 \times 10^{-3}$ relative to the volume of the controlled atmosphere, above the solder bath.

U.S. Pat. No. 4,646,958 (IBM), discloses a process for mounting semiconductor chips on ceramic substrates in which the remelting of the bumps that have not been fluxed and their adherence to the ceramic substrate is effectuated in a melting under a neutral or reducing atmosphere containing substantial proportions of silane, typically 2%, to reduce the lead and tin oxides which form in the bumps during their heating at the melting temperature.

According to one aspect of the invention, the controlled atmosphere is carried out in stages, a) by introducing into the hood the neutral gas to bring the residual oxygen content to a value below 200 ppm, then b) by introducing into the hood the neutral gas and the gaseous silicon hydride to a content more than four times higher than the residual oxygen content in the controlled atmosphere at the end of stage a).

More specifically, in a first phase of stage b), the silicon hydride is introduced up to a first content, between 10 and 20 times, typically of the order of 10 to 15 times the residual oxygen content at the end of phase a), then in a second phase of stage b) the silicon hydride is introduced up to a second content less than the first content, typically less than half the first content.

DETAILED DESCRIPTION OF THE INVENTION

Other characteristics and advantages of the present invention will appear from the following description of embodiments given by way of non-limiting examples.

In a hood defining an internal volume over a bath of solder in a soldering or wave tinning station and traversed by the path of the components to be brazed or tinned, there is injected nitrogen of electronic purity, which is to say having an oxygen content below 10 ppm. With a flow rate of nitrogen of the order of 3.5 $m^3/h$ injected above the soldering bath, there is obtained a residual oxygen content measured at the surface of the solder bath, less than 10 ppm. Under these conditions, corresponding to the prior art, the weight of slag at the surface of the bath is brought to 20 g/h instead of 900 g/h when the bath is exposed to air.

EXAMPLE 1

According to the invention, there is then injected into this gaseous overhead above the solder bath a mixture of nitrogen and silicon hydride, typically monosilane. To obtain a residual oxygen content less than ppm, given the geometry of the soldering tank and of the hood above it, there is introduced into this latter silicon hydride to a content higher than four times, typically of the order of eleven times the mean residual oxygen content before introduction of the silicon hydride, namely, with a ratio R of hydride/oxygen of 10, a flow rate of about 0.3 liter/hour (100 ppm) of monosilane for an overall gaseous flow rate injected into the hood of the order of 3.5 $m^3$/hour. After about 7 minutes of injection of this mixture, the residual oxygen value above the soldering bath falls to a value less than 1 ppm. There is then injected into the gaseous overhead of the bath, and in continuance of the process, a lesser amount of silicon hydride, typically slightly less than half the initial content, namely a flow rate less than 0.15 liter/hour (50 ppm) of silane for the same overall gaseous flow rate introduced into the hood. The residual oxygen content being brought to a level below 1 ppm, the weight of slag formed at the surface of the bath is brought to a value below 2 g/hour.

EXAMPLE 2

There is injected this time into the gaseous overhead above the bath a reduced flow of nitrogen (of the order of 2 $m^3$/h) permitting achieving at the surface of the solder bath a residual oxygen content of the order of 100 ppm, which would correspond, for a continuous tinning or brazing of components, to a weight of slag formed of about 100 g/hour. According to the invention, as before, to reduce the oxygen content to a value of the order of 1 ppm, there is then injected into the gaseous overhead of the bath a mixture of nitrogen and monosilane in an amount corresponding to about 10 times the residual oxygen content, with nitrogen alone, namely, a flow rate of about 4 liter/hour (1000 ppm) of silane for a same overall flow rate of about 3.5 $m^3$/hour introduced in the hood. As in the preceding example, after about 7 minutes of an injection of this mixture, the residual oxygen content at the surface of the bath will be less than 1 ppm. There is then reduced, in furtherance of the process, the quantity of silane injected with the nitrogen into the hood over the bath to a silane flow rate less than 2 liters/hour (500 ppm) to maintain a controlled atmosphere identical to that of the preceding example.

Although the present invention has been described with respect to particular embodiments, it is not thereby limited but on the contrary is susceptible to modifications and variations which will be apparent to one skilled in the art.

In particular, according to the intended use, the silane can be injected independently of the nitrogen into the protective hood, above the bath and, instead of pure nitrogen, the neutral gas can be constituted of argon, helium or a mixture of these gases with nitrogen.

What is claimed is:

1. A process for the application of a solder composition to the pins of an electronic component, comprising the step of bringing the pins of the component into contact with a solder wave at a soldering station comprising a solder bath exposed to a controlled atmosphere of low oxygen content maintained in a hood enclosing at least the surface of the bath, wherein the controlled atmosphere is comprised by at least one neutral gas and a gaseous silicon hydride whose content is between $50 \times 10^{-6}$ and $2 \times 10^{-3}$ of the volume of the controlled atmosphere, and wherein the controlled atmosphere is produced in steps:
   a) by introducing into the hood said neutral gas to bring the residual oxygen content to less than 200 ppm, then:
   b) by introducing into the hood said neurtral gas and said silicon hydride with a content greater than four times the residual oxygen content in the controlled atmosphere, at the end of step a).

2. Ther process of claim 1, wherein during step b), the silicon hydride is premixed with the neutral gas.

3. The process of claim 1, wherein during step (b), the silicon hydride is injected separately into the hood.

4. The process of claim 1, Wherein, in a first phase of step (b), said silicon hydride is introduced to a first content between 10 and 20 times the residual oxygen content at the end of step a), then in a second phase of step b) to a second content less than the first content.

5. The process of claim 4, Wherein the second content of silicon hydride is less than half the first content.

6. The process of claim 4, Wherein during all the second phase of step b), there is maintained a silicon hydride injection such that the residual oxygen content in the controlled atmosphere does not exceed 1 ppm.

* * * * *